United States Patent
Panchal

(10) Patent No.: US 9,936,447 B2
(45) Date of Patent: Apr. 3, 2018

(54) CONTROL OF SERVICES AT A CELL LEVEL OR A SECTOR LEVEL

(71) Applicant: Verizon Patent and Licensing Inc., Arlington, VA (US)

(72) Inventor: Jignesh S. Panchal, Hillsborough, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 15/278,115

(22) Filed: Sep. 28, 2016

(65) Prior Publication Data

US 2017/0019842 A1    Jan. 19, 2017

Related U.S. Application Data

(63) Continuation of application No. 14/445,418, filed on Jul. 29, 2014, now Pat. No. 9,480,008.

(51) Int. Cl.
| | |
|---|---|
| *H04W 28/02* | (2009.01) |
| *H04W 24/02* | (2009.01) |
| *H04W 48/16* | (2009.01) |
| *H04L 12/927* | (2013.01) |
| *H04W 72/04* | (2009.01) |
| *H04L 12/24* | (2006.01) |

(52) U.S. Cl.
CPC .......... *H04W 48/16* (2013.01); *H04W 24/02* (2013.01); *H04W 28/0268* (2013.01); *H04W 72/0493* (2013.01); *H04L 41/0893* (2013.01); *H04L 47/805* (2013.01)

(58) Field of Classification Search
CPC . H04W 48/16; H04W 24/00; H04W 28/0268; H04W 24/02; H04W 72/04; H04W 72/0493; H04W 16/12; H04L 41/0893; H04L 47/805
See application file for complete search history.

(56) References Cited

U.S. PATENT DOCUMENTS

| | | |
|---|---|---|
| 2003/0129971 A1 | 7/2003 | Gopikanth |
| 2005/0151686 A1 | 7/2005 | Ali |
| 2008/0089278 A1 | 4/2008 | Chang |
| 2012/0300687 A1 | 11/2012 | Aksu |

OTHER PUBLICATIONS

Devaki Chandramouli, "Non-Access-Stratum (NAS) protocol for Evolved Packet System (EPS); Stage 3", http://www.3gpp.org/DynaReport/24301.htm, Nov. 13, 2013, 4 pages.

(Continued)

*Primary Examiner* — Olumide T Ajibade Akonai

(57) ABSTRACT

A device may connect to a base station included in a service provider network. The base station may serve a geographic area where the device is located. The device may receive service information associated with the base station. The service information may correspond to the geographic area served by the base station, and may include an access state associated with a service. The access state may indicate a manner in which the device is permitted to access the service via the base station. The device may provide information associated with the access state to cause the device to access the service in accordance with the access state.

20 Claims, 13 Drawing Sheets

(56) References Cited

OTHER PUBLICATIONS

Benoist Sebire, "Evolved Universal Terrestrial Radio Access (E-UTRA) and Evolved Universal Terrestrial Radio Access Network (E-UTRAN); Overall description; Stage 2", Jan. 18, 2006, 3 pages.

Himke Van Der Velde, "Evolved Universal Terrestrial Radio Access (E-UTRA); Radio Resource Control (RRC); Protocol specification", Jul. 28, 2014, 4 pages.

3GPP, "3rd Generation Partnership Project; Technical Specification Group Core Network and Terminals; Non-Access-Stratum (NAS) protocol for Evolved Packet System (EPS); Stage 3 (Release 12)," 3GPP TS 24.301 V12.5.0, Jun. 2014, 367 pages.

3GPP, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12)," 3GPP TS 36.300 V12.2.0, Jun. 2014, 215 pages.

3GPP, "3rd Generation Partnership Project; Technical Specification Group Radio Access Network; Evolved Universal Terrestrial Radio Access (E-UTRA); Radio Resource Control (RRC); Protocol specification (Release 12)," 3GPP TS 36.331 V12.2.0, Jun. 2014, 365 pages.

"3rd Generation Partnership Project; Technical Specification Group Core Network and Terminals; Non-Access-Stratum (NAS) protocol for Evolved Packet System (EPS); Stage 3 (Release 12)", 3GPP TS 24.301 V12.5.0, Jun. 2014, 367 pages.

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12)", 3GPP TS 36.300 V12.2.0, Jun. 2014, 215 pages.

"3rd Generation Partnership Project; Technical Specification Group Radio Access Network; Evolved Universal Terrestrial Radio Access (E-UTRA); Radio Resource Control (RRC); Protocol specification (Release 12)", 3GPP TS 36.331 V12.2.0, Jun. 2014, 365 pages.

Chandramouli, "Non-Access-Stratum (NAS) protocol for Evolved Packet System (EPS); Stage 3", http://www.3gpp.org/DynaReport/24301.htm, Nov. 13, 2013, 4 pages.

Sebire, "Evolved Universal Terrestrial Radio Access (E-UTRA) and Evolved Universal Terrestrial Radio Access Network (E-UTRAN); Overall description; Stage 2", Jan. 18, 2006, 3 pages.

Van Der Velde, "Evolved Universal Terrestrial Radio Access (E-UTRA); Radio Resource Control (RRC); Protocol specification", Jul. 28, 2014, 4 pages.

CONTROL OF SERVICES AT A CELL LEVEL OR A SECTOR LEVEL

RELATED APPLICATION

This application is a continuation of U.S. patent application Ser. No. 14/445,418, filed Jul. 29, 2014, which is incorporated herein by reference.

BACKGROUND

A base station (e.g., an eNodeB (eNB), a base transceiver station, etc.) may serve one or more geographic areas (e.g., cells, sectors, etc.) in order to provide cellular coverage to a user device, located within one of the one or more geographic areas, to allow the user device to access a service (e.g., a voice service, a data service, etc.) via a connection with the base station.

DETAILED DESCRIPTION OF PREFERRED EMBODIMENTS

The following detailed description of example implementations refers to the accompanying drawings. The same reference numbers in different drawings may identify the same or similar elements.

A user device may be capable of accessing a service (e.g., a voice service, a data service, etc.), provided by a service provider network, via a base station that serves a geographic area (e.g., a cell, a sector, etc.), in which the user device is located. Presently, the service provider may be capable of controlling whether the service is available in large geographic area, such as a tracking area (e.g., associated with a mobility management entity (MME)) that includes the base station and one or more other base stations. However, the service provider may wish to exercise a greater level of control over the service (e.g., whether a feature of the service is enabled or disabled, whether the service is available, etc.) within a small geographic area (e.g., a particular cell, a particular sector, etc.). Implementations described herein may allow a service provider to control access to a service and/or a manner in which the service may be accessed within a geographic area served by a base station and/or within a portion of the geographic area served by the base station (e.g., a cell, a sector, etc.).

While the processes and/or methods described herein are described primarily in the context of a service provider controlling access to a service within a geographic area associated with a cell, these processes and/or methods may equally apply to a service provider controlling access to a service within one or more other geographic areas, such as a geographic area associated with a base station (e.g., including multiple cells), a geographic area associated with a sector (e.g., within a cell), or another geographic area.

Figure 1B:
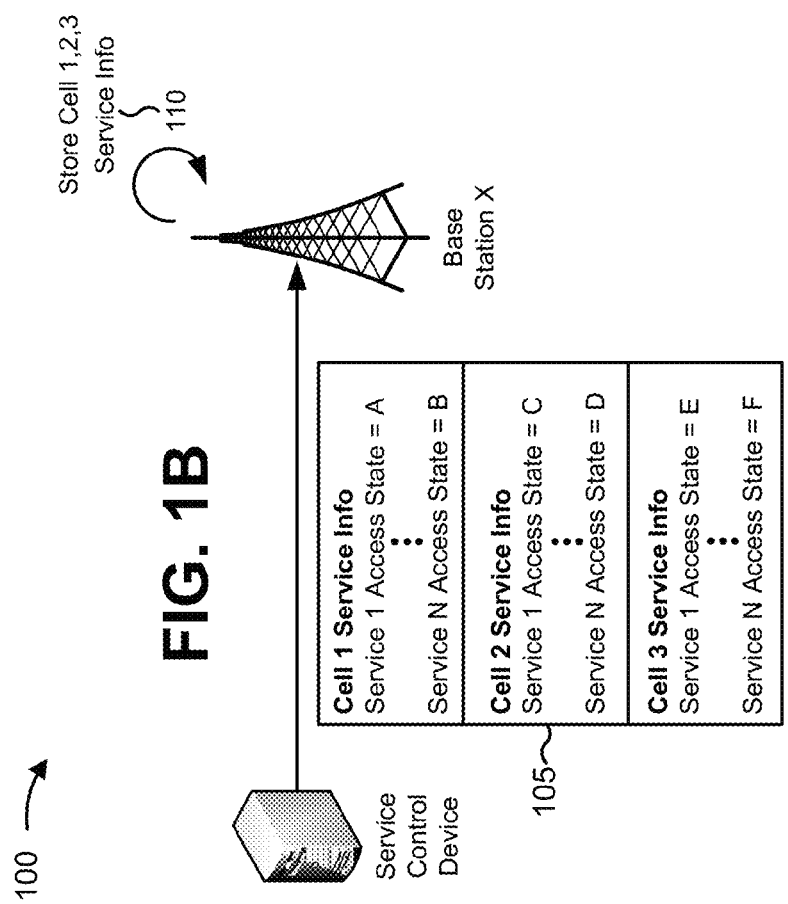
FIGS. 1A-1C are diagrams of an overview of an example implementation described herein.
Figure 1A:
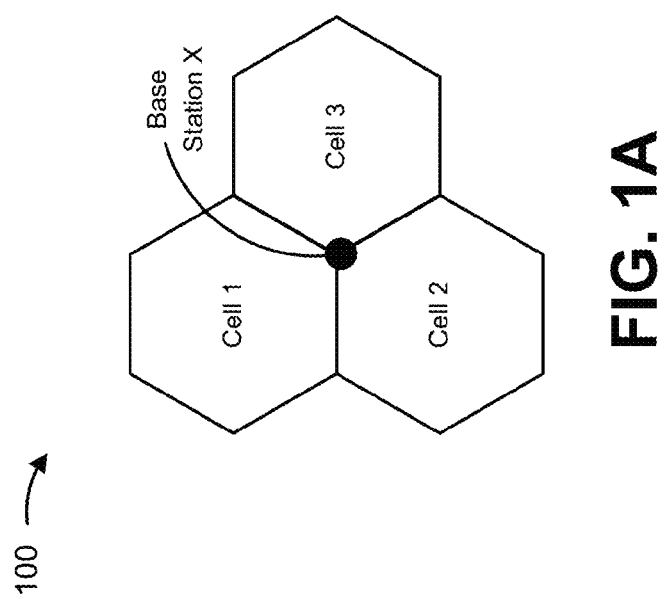
Figure 1C:
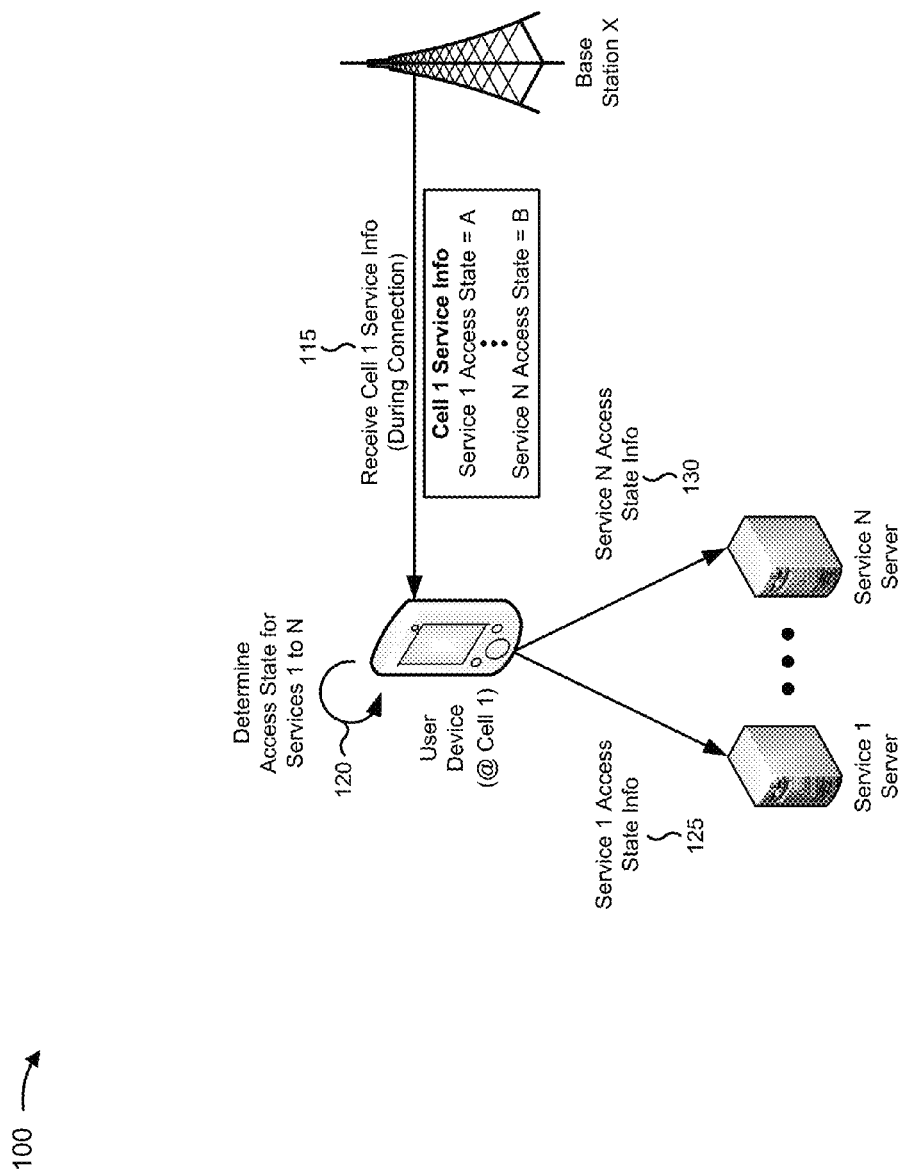

FIGS. 1A-1C are diagrams of an overview of an example implementation 100 described herein. For the purposes of example implementation 100, and as shown in FIG. 1A, assume that base station X, included in a service provider network, is configured such that base station X may allow a group of user devices, connected to base station X and located within geographic areas corresponding to three cells (e.g., cell 1, cell 2, cell 3), to access a group of services (e.g., service 1 through service N).

As shown in FIG. 1B, assume that the service provider may provide service information, associated with controlling the group of services, to base station X via a service control device. As shown by reference number 105, the service control device may determine (e.g., based on operator input) service information associated with cell 1, cell 2, and cell 3, and may provide the service information to base station X. As shown, the service information for each cell may include service information associated with service 1 through service N, and may include information that identifies an access state (e.g., a manner in which a user device may access a service) for each service within each cell. As shown, access states may vary across services, and/or cells. For example, a user device located in cell 1 may access service 1 in accordance with access state A, whereas a user device located in cell 2 may access service 1 in accordance with access state B. As shown by reference number 110, base station X may store the service information.

For the purposes of FIG. 1C, assume that a user device is located in cell 1, and that the user device is establishing a connection (e.g., after powering on, as a result of a handover decision, etc.) with base station X. As shown by reference number 115, base station X may provide, to the user device, the cell 1 service information when the user device is establishing a connection with base station X. As shown by reference number 120, the user device may receive the cell 1 service information, and may determine (e.g., based on the cell 1 service information associated with service 1 through service N), a set of service access states corresponding to services 1 through N.

As shown by reference number 125, the user device may provide information associated with the service 1 access state to a service 1 server. Similarly, as shown by reference number 130, the user device may provide information associated with the service N access state to a service N server. In some implementations, the user device may also store the information associated with the access states and/or may update service clients (e.g., applications hosted by the user device) that correspond to services associated with each access state. The user device and/or the service server (e.g., corresponding to each service) may then permit the user device to access service 1 through service N in accordance with the access state corresponding to each service.

In this way, a service provider may control access to a service and/or a manner in which the service may be accessed within a geographic area served by a base station and/or within a portion of the geographic area served by the base station (e.g., a cell, a sector, etc.).

Figure 2:
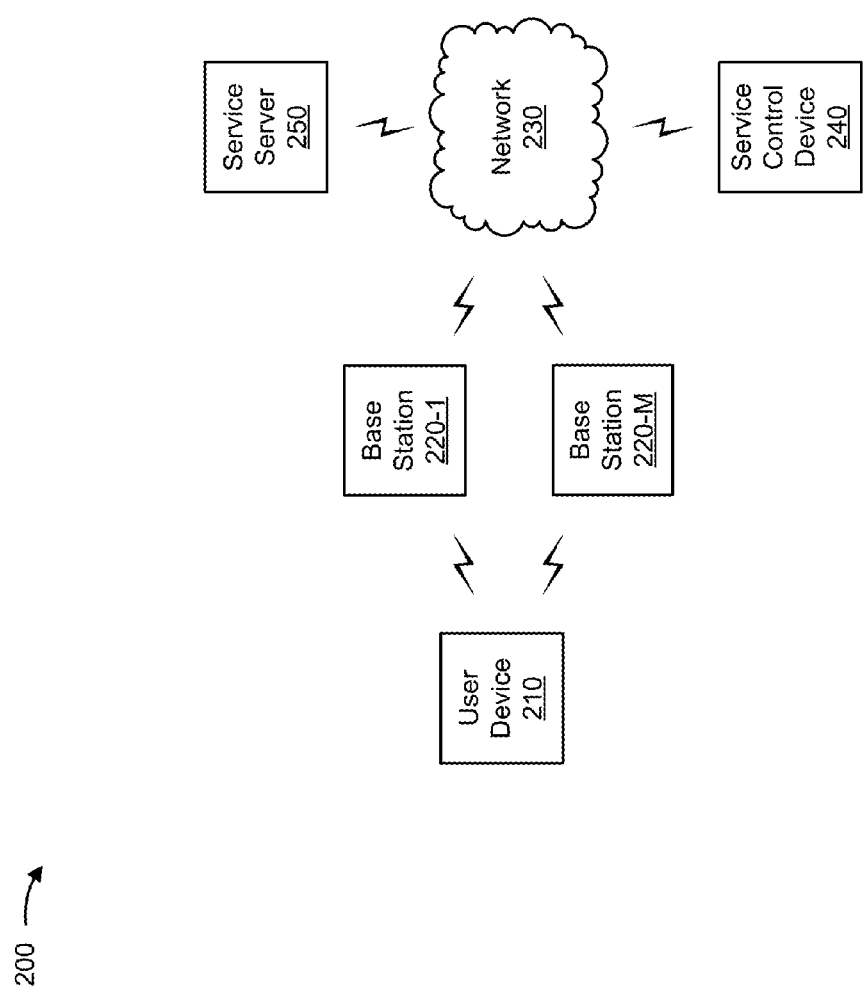
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user device 210, one or more base stations 220-1 through 220-M (M≥1) (hereinafter referred to collectively as base stations 220, and individually as base station 220), a network 230, a service control device 240, and a service server 250. Devices of environment 200 may interconnect via wired connections, wireless connections, or a combination of wired and wireless connections.

User device 210 may include a device capable of receiving, generating, storing, processing, and/or providing information associated with a service accessible by user device 210 via base station 220. For example, user device 210 may include a communications and/or computing device, such as a mobile phone (e.g., a smart phone, a radiotelephone, etc.), a laptop computer, a tablet computer, a handheld computer, a gaming device, or a similar device. In some implementations, user device 210 may connect to base station 220 in order to access a service provided, by service server 250, via base station 220 and/or network 230.

Base station 220 may include one or more devices capable of transferring traffic, associated with a service, destined for and/or received from user device 210. In some implementations, base station 220 may include an eNB, a base transceiver station, etc. that receives traffic from and/or sends traffic to network 230. Base station 220 may send traffic to and/or receive traffic from user device 210 via an air interface. In some implementations, base station 220 may be configured to allow user devices 210, connected to base station 220 and located within one or more geographic areas (e.g., cells, sectors, etc.), to access services provided by service servers 250 via network 230. In some implementations, base station 220 may include a small cell base station, such as a base station of a microcell, a picocell, and/or a femtocell. In some implementations, base station 220 may act as a serving base station 220 (e.g., a base station 220 to which user device 210 is connected in order to access a service). Additionally, or alternatively, base station 220 may act as a target base station 220 (e.g., a base station 220 to which user device 220 is to be handed over in order to access a service).

Network 230 may include one or more wired and/or wireless networks. For example, network 230 may include a cellular network (e.g., a long term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or a combination of these or another type of network.

Service control device 240 may include a device capable of receiving, generating, storing, processing, and/or providing service information associated with base station 220. For example, service control device 240 may include a server device or a group of server devices. In some implementations, service control device 240 may be capable of determining (e.g., based on operator input, based on information received from another device, etc.) service information associated with base station 220. Additionally, or alternatively, service control device 240 may be capable of providing service information to base station 220.

Service server 250 may include a device capable of receiving, generating, storing, processing, and/or providing information associated with a service that may be accessed by user device 210 (e.g., via base station 220). For example, service server 250 may include a server device or a group of server devices. In some implementations, service server 250 may be capable of communicating with user device 210 (e.g., via base station 220, via network 230) in order to provide a service to user device 210. Additionally, or alternatively, service server 250 may be capable of receiving, determining, processing, and/storing information associated with an access state, corresponding to user device 210, for the service provided by service server 250.

The number and arrangement of devices and networks shown in FIG. 2 is provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
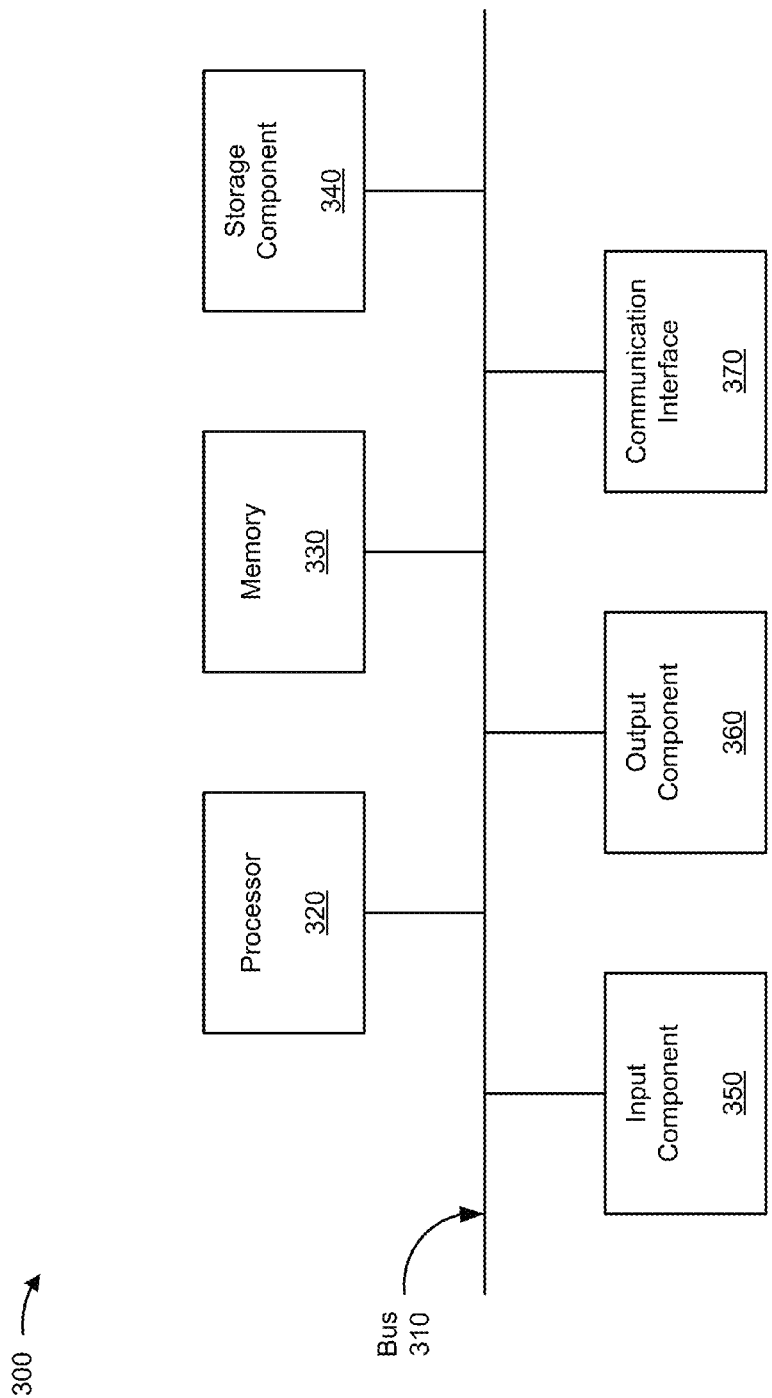
FIG. 3 is a diagram of example components of one or more devices of FIG. 2.

FIG. 3 is a diagram of example components of a device 300. Device 300 may correspond to user device 210, base station 220, service control device 240, and/or service server 250. In some implementations, user device 210, base station 220, service control device 240, and/or service server 250 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user (e.g., operator) input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 is provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
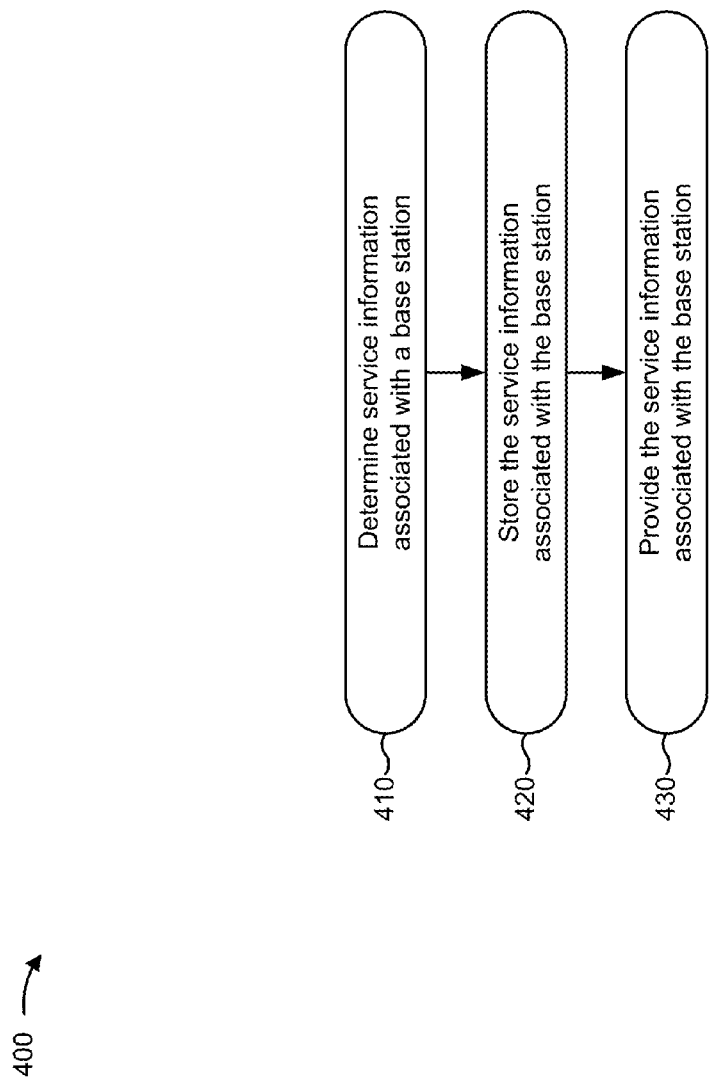
FIG. 4 is a flow chart of an example process for receiving, storing, and providing service information associated with a base station.

FIG. 4 is a flow chart of an example process 400 for receiving, storing, and providing service information associated with a base station. In some implementations, one or more process blocks of FIG. 4 may be performed by base station 220. Additionally, or alternatively, one or more process blocks of FIG. 4 may be performed by another device or a group of devices separate from or including base station 220, such as service control device 240.

As shown in FIG. 4, process 400 may include determining service information associated with a base station (block 410). For example, base station 220 may determine service information associated with base station 220. In some implementations, base station 220 may determine the service information when another device provides the service information to base station 220. Additionally, or alternatively, base station 220 may determine the service information when base station 220 receives an indication to determine the service information.

Service information may include information, associated with base station 220, that identifies a manner in which one or more services, provided via base station 220, may be accessed by user devices 210 connected to base station 220. For example, the service information may include information that identifies a service that may (or may not) be accessed by user device 210 via base station 220 (e.g., a name of the service, a service identifier), information that identifies a type of the service (e.g., a voice service, a video service, a data service, etc.), information that identifies an access state associated with the service (e.g., one or more instructions, one or more numerical instructions, etc.), or another type of information. In some implementations, the service information may include information corresponding to multiple services.

An access state, associated with a service, may indicate a manner in which the service may be accessed (e.g., via base station 220) by user device 210. In some implementations, the access state may include information indicating whether a service may be accessed by user device 210, information indicating whether a feature, aspect, attribute, etc. of the service may be accessed by user device 210, and/or another type of information. For example, an access state for a voice over internet protocol (VoIP) service may indicate whether the VoIP service may be accessed by user device 210 via base station 220. As another example, the access state for the VoIP service may indicate that the VoIP service may be accessed by user device 210, and may indicate that user device 210 may access the VoIP service to place a VoIP call (e.g., mobile originating (MO) calls are enabled), but may also indicate that user device 210 may not access the VoIP service to receive a VoIP call (e.g., mobile terminating (MT) calls are disabled). As yet another example, the access state may indicate whether user device 210, while on a VoIP call when being handed over to base station 220, may continue the VoIP call.

In some implementations, the access state may be represented by one or more instructions (e.g., MO Enabled=YES, MT Enabled=NO, etc.). Additionally, or alternatively, the access state may be represented by a string of characters (e.g., 1, 001, 2C3B, 4#A&, etc.) to be interpreted by user device 210. For example, when the access state includes a character string, base station 220 may determine (e.g., based on information received from service control device 240) mapping information associated with interpreting the character string that represents the access state, and may broadcast (e.g., periodically, when the mapping information is updated, etc.) the mapping information to user devices 210 (e.g., and user devices 210 may store the mapping information). Additionally, or alternatively, user device 210 may receive (e.g., via network 230) the mapping information from another device, associated with the network operator. For example, user device 210 may receive the mapping information during a subscriber identity module (SIM) provisioning procedure associated with user device 210. In this way, user device 210 may be capable of interpreting the access state represented by the character string based on the mapping information (e.g., when user device 210 receives the service information, as described below). In some implementations, a set of character strings (e.g., that corresponds to a set of access states) may be standardized such that multiple user devices 210 and/or multiple base stations 220 may use the set of character strings.

In some implementations, the service information may be associated with base station 220. For example, the service information may include service information associated with controlling access to services within a geographic area served by base station 220 (e.g., all cells and/or sectors served by base station 220). Additionally, or alternatively, the service information may be associated with controlling access to services within one or more cells served by base station 220. For example, the service information may include service information associated with controlling access to services within a geographic area corresponding to a particular cell served by base station 220. Additionally, or alternatively, the service information may be associated with controlling access to services within one or more sectors served by base station 220.

In some implementations, base station 220 may determine the service information based on information provided by service control device 240. For example, service control device 240 may receive operator input (e.g., from a user associated with the service provider) that identifies service information for one or more services associated with base station 220, and may provide the service information to base station 220. In this example, base station 220 may receive the service information from service control device 240.

Additionally, or alternatively, base station 220 may determine the service information based on information stored by base station 220. For example, base station 220 may store a service information algorithm, associated with a service, that causes base station 220 to update (e.g., automatically, dynamically, etc.) service information, associated with the service, based on one or more performance metrics (e.g., a quality of service level, a cell capacity consumption, a service blocking statistic, etc.), associated with the service, that may be observed, measured, determined, etc. by base station 220. In this example, base station 220 may provide information associated with the one or more performance metrics as input to the service information algorithm, and may receive, as output, the service information and/or information that identifies a manner in which base station 220 is to update, alter, and/or modify existing service information.

As further shown in FIG. 4, process 400 may include storing the service information associated with the base station (block 420). For example, base station 220 may store the service information associated with base station 220. In some implementations, base station 220 may store the service information when base station 220 determines the service information (e.g., after base station 220 determines the service information). Additionally, or alternatively, base station 220 may store the service information based on receiving information, indicating that base station 220 is to store the service information, from another device, such as service control device 240.

In some implementations, base station 220 may store the service information in a memory location (e.g., a RAM, a ROM, a cache, a hard disk, etc.) of base station 220. Additionally, or alternatively, base station 220 may provide the service information to another device for storage.

In some implementations, base station 220 may store information associated with the service information such that previous service information (e.g., service information determined by base station 220 at an earlier time) is overwritten and/or deleted. Additionally, or alternatively, base station 220 may store the service information such that base station 220 may retrieve the service information at a later time.

As further shown in FIG. 4, process 400 may include providing the service information associated with the base station (block 430). For example, base station 220 may provide the service information associated with the base station. In some implementations, base station 220 may provide the service information after base station 220 determines and/or stores the service information. Additionally, or alternatively, base station 220 may provide the service information when user device 210 connects to base station 220. Additionally, or alternatively, base station 220 may provide the service information when base station 220 receives, from another device, an indication that base station 220 is to provide the service information.

In some implementations, base station 220 may provide the service information to user devices 210 connected to base station 220 when base station 220 determines the service information. For example, a group of user devices 210 (e.g., located in a particular cell served by base station 220) may be connected to base station 220 when base station 220 determines the service information. In this example, if the service information includes updated service information associated with the particular cell, then base station 220 may notify (e.g., by raising a broadcast update flag) the group of user devices 210 that base station 220 has determined updated service information. Here, the group of user devices 210 may read (e.g., based on the broadcast update flag) a broadcast message, provided by base station 220, that includes the update service information. In this way, base station 220 may provide (e.g., broadcast) the update service information to the group of user devices 210 in order to allow the group of user devices 210 to receive the update service information. Each user device 210, of the group of user devices 210, may receive the updated service information associated with the particular cell, and may act upon the service information as necessary, as described below.

Additionally, or alternatively, base station 220 may provide the service information to user device 210 when user device 210 connects to base station 220 (e.g., an initial connection to base station 220, a handover to base station 220, etc.), as described below.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5A:
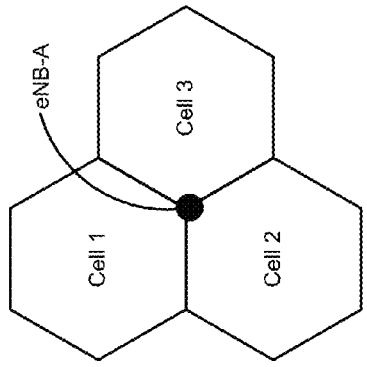
FIGS. 5A and 5B are diagrams of an example implementation relating to the example process shown in FIG. 4.
Figure 5B:
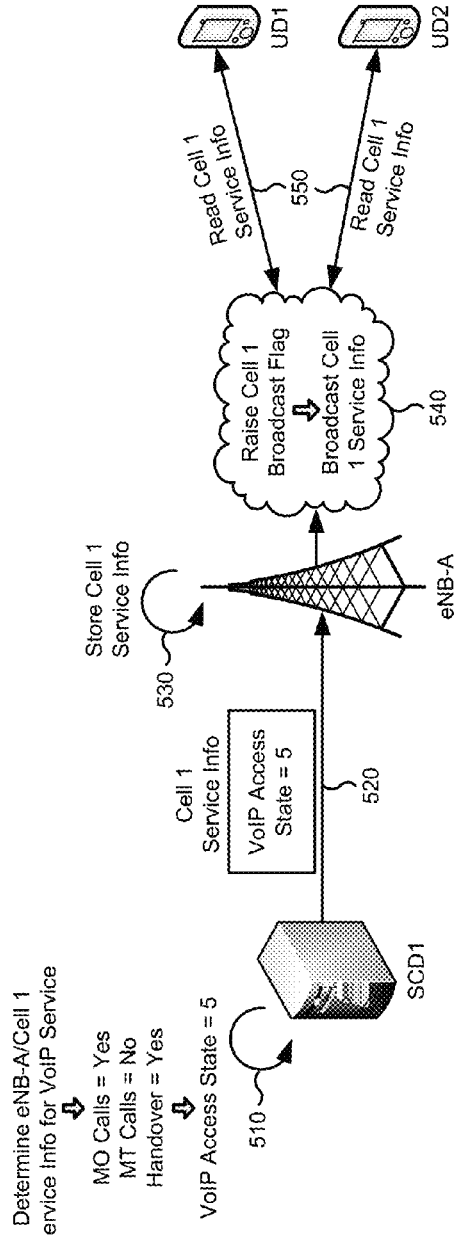

FIGS. 5A and 5B are diagrams of an example implementation 500 relating to example process 400 shown in FIG. 4. For the purposes of example implementation 500, and as shown in FIG. 5A, assume that a base station 220 (e.g., eNB-A), included in a service provider network, is configured such that eNB-A may allow user devices 210, connected to eNB-Z and located within geographic areas corresponding to three cells (e.g., cell 1, cell 2, cell 3), to access a VoIP service provided by a VoIP server.

As shown in FIG. 5B, assume that the service provider provides service information, associated with controlling access to the VoIP service, to eNB-A via service control device 240 (e.g., SCD1). As shown by reference number 510, SCD1 may determine (e.g., based on operator input) cell 1 service information for user devices 210 located in cell 1 that access the VoIP service through eNB-A. As shown, the cell 1 service information may indicate that user device 210 (e.g., located in cell 1 and accessing the VoIP service through eNB-A) may not place a VoIP call (e.g., MO Calls=NO), may indicate that user device 210 may receive a VoIP call (e.g., MT calls=YES), and may indicate that user device 210 may stay on a VoIP call that is in progress when user device 210 located within cell 1 is handed over to eNB-A. As further shown, SCD1 may determine (e.g., based on information stored by SCD1) an access state (e.g., VoIP Access State=5) that represents the cell 1 service information. As shown by reference number 520, SCD1 may provide the cell 1 service information, associated with eNB-A, to eNB-A. While example implementation 500 is described in the context of service information associated with a single service (e.g., the VoIP service), in other example implementations, SCD1 may determine and provide service information, associated with access to multiple services (e.g., in addition to the VoIP service) via cell 1, to eNB-A.

As shown by reference number 530, eNB-A may receive the cell 1 service information, and may store the cell 1 service information. As shown by reference number 540, eNB-A may raise a broadcast flag, associated with cell 1, and may include the cell 1 service information within a cell 1 message broadcasted to user devices 210 (e.g., UD1 and UD2) located in cell 1 and connected to eNB-A. As shown by reference number 550, UD1 and UD2 may determine (e.g., based on the broadcast flag raised by eNB-A) that UD1 and UD2 are to read the cell 1 broadcast message, and may read the cell 1 broadcast message and receive the cell 1 service information. UD1 and UD2 may then act upon the cell 1 service information as necessary, as described below.

As indicated above, FIGS. 5A and 5B are provided merely as an example. Other examples are possible and may differ from what was described with regard to FIGS. 5A and 5B.

Figure 6:
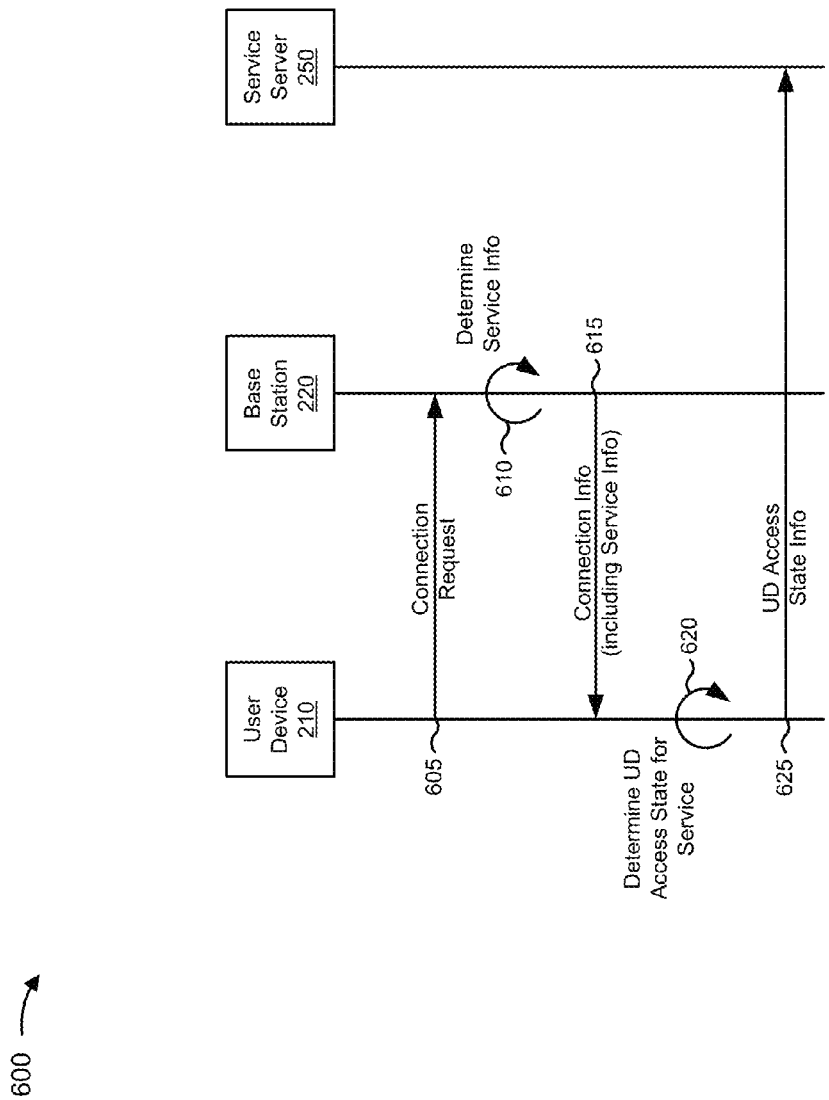
FIG. 6 is a call flow diagram of an example process for determining an access state, associated with a user device connecting to a base station, based on service information associated with the base station.

FIG. 6 is a call flow diagram of an example process 600 for determining an access state, associated with a user device connecting to a base station, based on service information associated with the base station. In some implementations, one or more operations of FIG. 6 may be performed by one or more devices included in environment 200.

As shown in FIG. 6, process 600 may include sending a connection request associated with a user device and a base station (shown at reference number 605). For example, user device 210 may send a connection request associated with user device 210 and base station 220. In some implementations, user device 210 may send the connection request when user device 210 is not connected to any base station 220.

A connection request may include a request associated with requesting a connection between user device 210 and base station 220 such that user device 210 may access a service, provided by service server 250, via base station 220 and/or network 230. For example, user device 210, when not connected to any base station 220 (e.g., when user device 210 powers-on, when user device 210 wakes up from an idle mode, etc.), may initiate communication with base station 220, serving a geographic area where user device 210 is located, by sending a random-access (RA) preamble to base station 220, and may receive an RA response from base station 220. In this example, user device 210 may then send a radio resource control (RRC) connection request to base station 220. Additionally, or alternatively, user device 210 may send another type of connection request associated with requesting a connection between user device 210 and base station 220.

As further shown in FIG. 6, process 600 may include determining service information associated with the base station (shown at reference number 610). For example, base station 220 may determine service information associated with base station 220. In some implementations, base station 220 may determine the service information after user device 210 sends the connection request (e.g., after base station 220 receives the connection request). Additionally, or alternatively, base station 220 may determine the service information when base station 220 is preparing to send, to user device 210, connection information associated with establishing a connection between user device 210 and base station 220.

In some implementations, base station 220 may determine the service information based on information stored by base station 220. For example, base station 220 may receive and store service information associated with base station 220 (e.g., as described above), and base station 220 may determine the service information based on the stored service information. Additionally, or alternatively, base station 220 may determine the service information based on information received from service control device 240. For example, base station 220 may receive the connection request from user device 210, and may send a service information request to service control device 240. In this example, base station 220 may determine the service information based on a response provided by service control device 240.

In some implementations, base station 220 may determine service information associated with a geographic area where user device 210 is located. For example, if user device 210 is located in a particular cell served by base station 220, then base station 220 may determine service information that corresponds to the particular cell served by base station 220 (e.g., when the service information differs across cells served by base station 220). As another example, if user device 210 is located in a particular cell served by base station 220, then base station 220 may determine service information that corresponds to base station 220 (e.g., when the service information, stored by base station 220, is to be applied to all cells served by base station 220). As yet another example, if user device 210 is located in a particular sector (e.g., within a cell served by base station 220), then base station 220 may determine service information that corresponds to the particular sector served by base station 220 (e.g., when the service information differs across sectors within a cell served by base station 220).

As further shown in FIG. 6, process 600 may include providing connection information, including the service information associated with the base station, to the user device (shown at reference number 615). For example, base station 220 may provide connection information, including the service information associated with base station 220, to user device 210. In some implementations, base station 220 may provide the connection information to user device 210 after base station 220 determines the service information.

Connection information may include information associated with establishing a connection between user device 210 and base station 220 such that user device 210 may access a service provided by service server 250 via base station 220 and/or network 230. For example, base station 220 may send (e.g., in response to an RRC connection request) RRC connection setup information and/or RRC connection reconfiguration information that allows the connection between user device 210 and base station 220 to be established. In this example, base station 220 may include the service information, associated with base station 220, within the RRC connection setup information and/or within the RRC connection reconfiguration information provided to user device 210. Additionally, or alternatively, as described above, user device 210 may receive the service information, associated with base station 220, at an earlier timer via a broadcast message. Additionally, or alternatively, base station 220 may send another type of connection information associated with establishing a connection between user device 210 and base station 220. In some implementations, user device 210 may receive the connection information, and may establish the connection between user device 210 and base station 220 based on the connection information.

As further shown in FIG. 6, process 600 may include determining an access state, associated with the user device and the service, based on the service information associated with the base station (shown at reference number 620). For example, user device 210 may determine an access state, associated with user device 210 and the service provided by service server 250, based on the service information associated with base station 220. In some implementations, user device 210 may determine the access state after user device 210 receives the service information from base station 220. Additionally, or alternatively, user device 210 may determine the access state when user device 210 establishes the connection between user device 210 and base station 220.

As discussed above, an access state, associated with a service, may include information indicating a manner in which the service may be accessed (e.g., via base station 220) by user device 210. In some implementations, user device 210 may determine the access state based on the service information (e.g., when the service information includes information associated with the access state). In some implementations, user device 210 may determine multiple access states that correspond to multiple services identified in the service information.

In some implementations, user device 210 may determine the access state by interpreting the access state included in the service information. For example, if the access state, associated with the service, is represented by a string of characters, then user device 210 may interpret (e.g., based on mapping information stored by user device 210) the access state, as described above. In this example, user device 210 may interpret the access state by identifying whether one or more features, aspects, attributes, etc. of the service may be accessed by user device 210.

As further shown in FIG. 6, process 600 may include providing information associated with the access state (shown at reference number 625). For example, user device 210 may provide information associated with the access state. In some implementations, user device 210 may provide the information associated with access state after user device 210 determines the access state. Additionally, or alternatively, user device 210 may provide the information associated with access state after user device 210 receives an indication to provide the information associated with the access state.

In some implementations, user device 210 may provide the information associated with the access state to cause user device 210 to access the service, associated with the access state, in accordance with the access state. For example, if user device 210 determines information indicating that user device 210 may access a particular feature of the service, then user device 210 may provide the information associated with the access state in order to enable user device 210 to access the feature of the service. As another example, if user device 210 determines information indicating that user device 210 may not access the service, then user device 210 may provide the information associated with the access state in order to disable user device 210 from accessing the service.

In some implementations, user device 210 may provide the information associated with the access state to a service client, hosted by user device 210, associated with the service. For example, if the access state indicates that MO calls, associated with a VoIP service, are to be disabled, then user device 210 may provide, to a VoIP client hosted by user device 210, information that causes the VoIP client to disable MO calls.

Additionally, or alternatively, user device 210 may provide the information associated with the access state to service server 250 associated with the service. For example, if the access state indicates that MT calls, associated with a VoIP service, are to be disabled, then user device 210 may provide, to service server 250 associated with the VoIP service, information that causes service server 250 to prevent user device 210 from receiving MT calls provided via service server 250. In this example, service server 250 may receive the information associated with the access state, and may determine another manner in which to handle MT VoIP calls destined for user device 210 (e.g., service server 250 may determine that a MT VoIP call to user device 210 is to be routed via a CDMA network, is to be routed to voicemail, is to be presented with a message the that MT VoIP call cannot be completed, etc.).

In some implementations, user device 210 may provide information associated with a first access state for a first service to a first service client and/or a first service server 250, information associated with a second access state for a second service to a second service client and/or a second service server 250 (e.g., such that user device 210 provides information associated with multiple access states corresponding to multiple services identified in the service information).

Although FIG. 6 shows example operations of process 600, in some implementations, process 600 may include additional operations, fewer operations, different operations, or differently arranged operations than those depicted in FIG. 6. Additionally, or alternatively, two or more of the operations of process 600 may be performed in parallel.

Figure 7A:
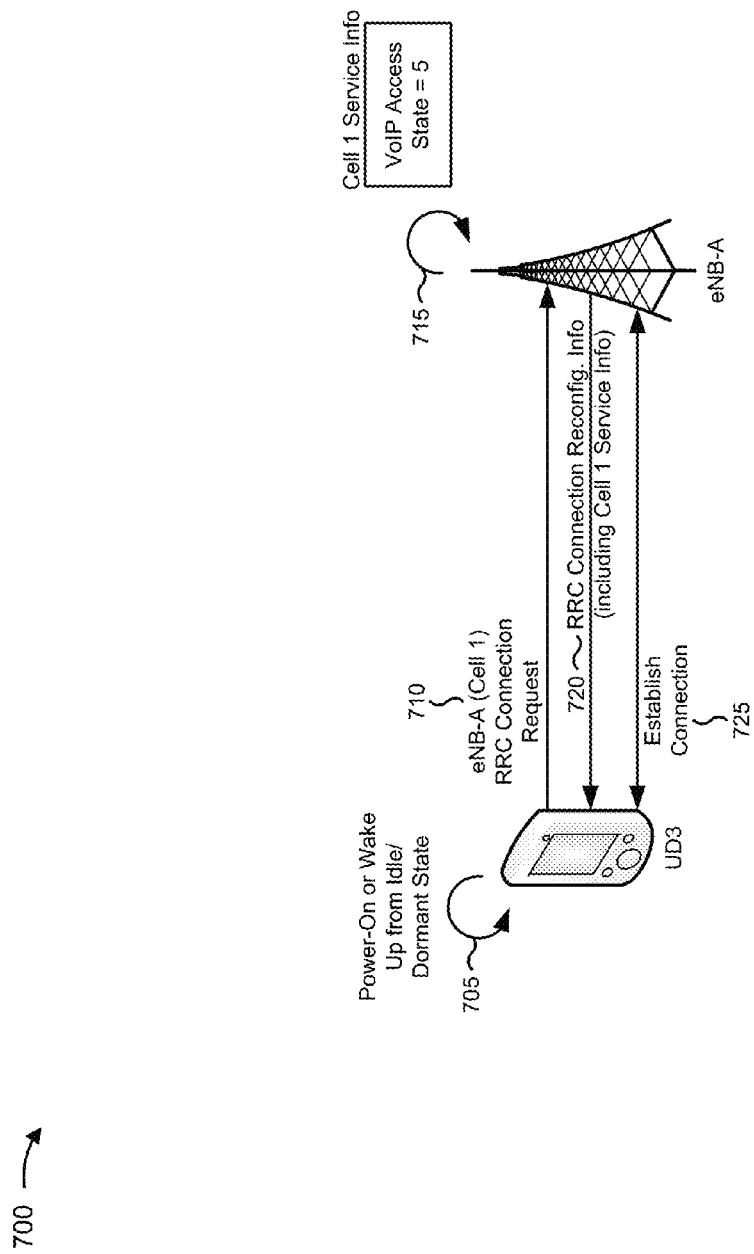
FIGS. 7A and 7B are diagrams of an example implementation relating to the example process shown in FIG. 6.
Figure 7B:
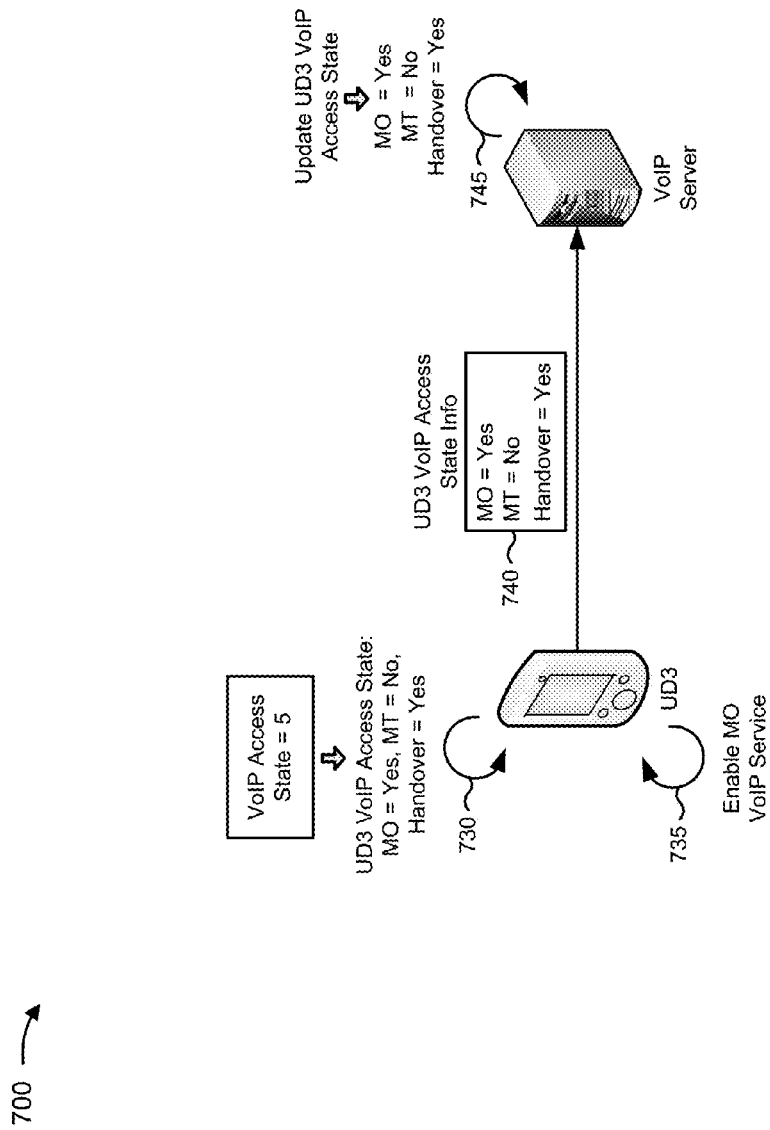

FIGS. 7A and 7B are diagrams of an example implementation 700 relating to example process 600 shown in FIG. 6. For the purposes of example implementation 700, assume that base station 220, identified as eNB-A, stores service information associated with a group of cells (e.g., including cell 1) served by eNB-A. Further, assume that user device 210 (e.g., identified as UD3) is located in a geographic area corresponding to cell 1 and is not connected to any base station 220 (e.g., when UD3 is in a dormant state or is powered off).

As shown in FIG. 7A, and by reference number 705, UD3 may be transitioning to an activate state (e.g., from a dormant state) or powering on and, as shown by reference number 710, may send, to eNB-A, an RRC connection request associated with establishing a connection between UD3 and eNB-A. As shown by reference number 715, eNB-A may receive the RRC connection request, and may determine cell 1 service information associated with eNB-A (e.g., since UD3 is located in cell 1). As shown, the cell 1 service information may include information identifying an access state for a VoIP service (e.g., VoIP Access State=5) to be accessed by user devices 210 when located in cell 1 and connected to eNB-A. As shown by reference number 720, eNB-A may provide (e.g., as part of a process for establishing a connection between UD3 and eNB-A) RRC connection reconfiguration information to UD3. As shown, the RRC connection reconfiguration information may include the cell 1 service information. As shown by reference number 725, UD3 may establish the connection between UD3 and eNB-A based on receiving the RRC connection reconfiguration information (e.g., including the cell 1 service information).

As shown in FIG. 7B, and by reference 730, UD3 may receive the service information, may identify the access state for the VoIP service (e.g., VoIP Access State=5), and may interpret (e.g., based on information stored by UD3) the access state to determine information associated with the UD3 VoIP access state (e.g., UD3 VoIP Access State: MO=Yes, MT=No, Handover=Yes). As shown by reference number 735, UD3 may provide the information associated with UD3 VoIP access state to a VoIP client, hosted by UD3, that causes UD3 to enable a MO call feature of the VoIP service (e.g., such that UD3 may place a VoIP call). As shown by reference number 740, UD3 may also provide the information associated with the UD3 VoIP access state to a VoIP server (e.g., associated with providing the VoIP service). As shown by reference number 745, the VoIP server may receive the information associated with the UD3 VoIP access state and may update information, stored by the VoIP server, such that the VoIP service may be accessed by UD3 in accordance with the information associated with the UD3 VoIP access state (e.g., the VoIP server update the information such that UD3 may not receive MT VoIP calls via the VoIP service).

As indicated above, FIGS. 7A and 7B are provided merely as an example. Other examples are possible and may differ from what was described with regard to FIGS. 7A and 7B.

Figure 8:
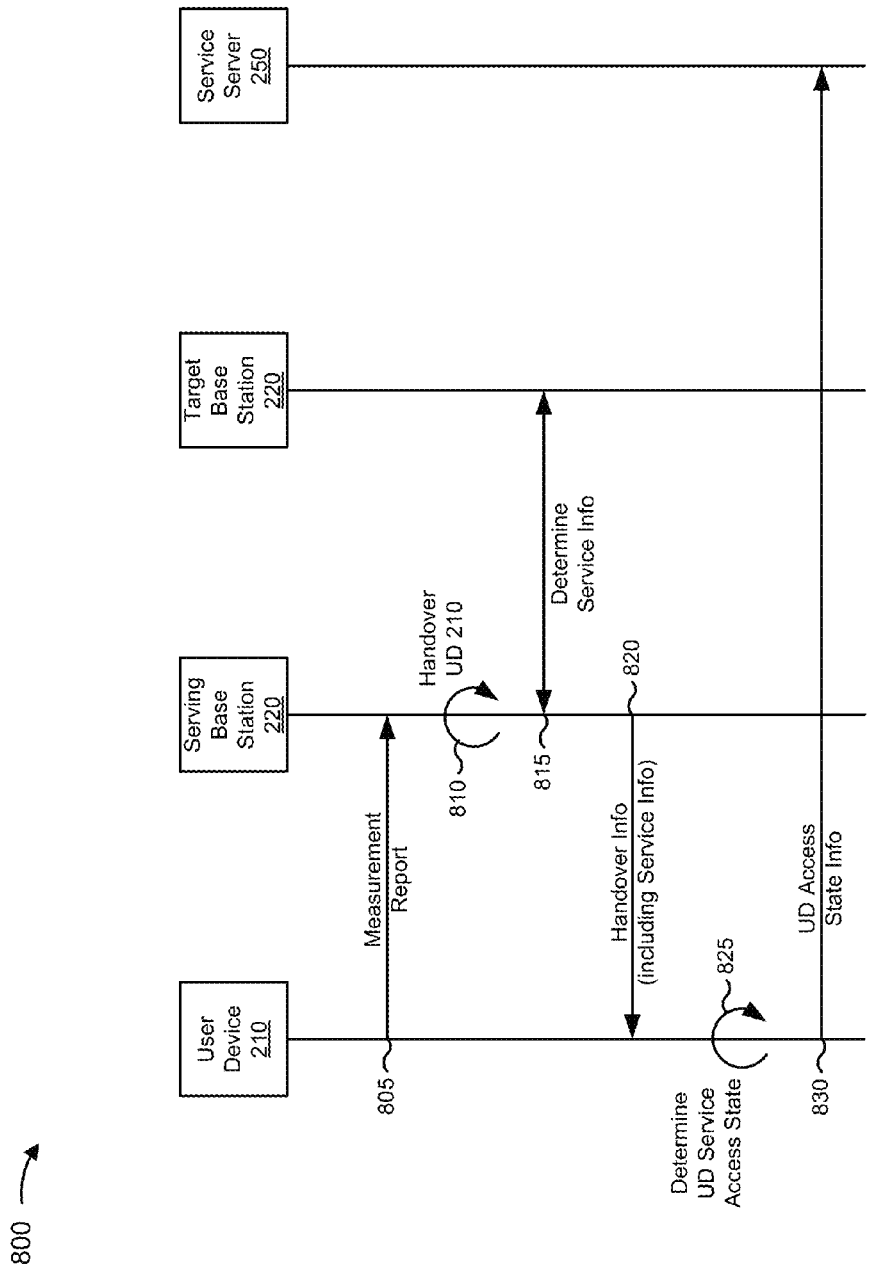
FIG. 8 is a call flow diagram of an example process for determining an access state, associated with a user device being handed over from a serving base station to a target base station, based on service information associated with the target base station.

FIG. 8 is a call flow diagram of an example process 800 for determining an access state, associated with a user device being handed over from a serving base station to a target base station, based on service information associated with the target base station. In some implementations, one or more operations of FIG. 8 may be performed by one or more devices included in environment 200.

While the process of FIG. 8 is described in the context of user device 210 being handed over from serving base station 220 to target base station 220, this process equally apply to user device 210 being handed over in another manner, such as a from a serving cell to a target cell, a serving sector to a target sector, a serving base station (eNB) to a target base station (eNB), etc.

As shown in FIG. 8, process 800 may include providing a measurement report associated with a user device and a serving base station (shown at reference number 805). For example, user device 210 may provide a measurement report associated with user device 210 and serving base station 220. In some implementations, user device 210 may provide the measurement report when user device 210 determines the measurement report. Additionally, or alternatively, user device 210 may provide the measurement report when user device 210 receives an indication that user device 210 is to send the measurement report.

A measurement report may include information associated with determining whether user device 210 is to be handed over from serving base station 220 to target base station 220. For example, user device 210 may measure information (e.g., signal strength information, signal quality information, etc.) associated with serving base station 220, target base station 220, a serving cell, a target cell, etc. and may provide (e.g., periodically, based on a threshold condition being satisfied, etc.) the information, in the form of a measurement report, to serving base station 220.

As further shown in FIG. 8, process 800 may include determining that the user device is to be handed over from the serving base station to a target base station (shown at reference number 810). For example, serving base station 220 may determine that user device 210 is to be handed over from serving base station 220 to target base station 220. In some implementations, serving base station 220 may determine that user device 210 is to be handed over to target base station 220 after user device 210 provides the measurement report. Additionally, or alternatively, serving base station 220 may determine that user device 210 is to be handed over to target base station 220 when serving base station 220 receives an indication that serving base station 220 is to determine whether user device 210 is to be handed over to target base station 220. For example, serving base station 220 may receive, from target base station 220, an indication that user device 210 is to be handed over to target base station 220.

In some implementations, serving base station 220 may determine that user device 210 is to be handed over to target base station 220 based on the measurement report. For example, serving base station 220 may store a handover algorithm associated with determining whether user device 210 is to be handed over to target base station 220. In this example, serving base station 220 may provide information associated with the measurement report as input to the handover algorithm, and may receive, as output, information indicating that user device 210 is to be handed over to target base station 220.

As further shown in FIG. 8, process 800 may include determining service information associated with the target base station (shown at reference number 815). For example, serving base station 220 may determine service information associated with target base station 220. In some implementations, serving base station 220 may determine the service information, associated with target base station 220, after serving base station 220 determines that user device 210 is to be handed over to target base station 220. Additionally, or alternatively, serving base station 220 may determine the service information, associated with target base station 220, when serving base station 220 receives the service information from target base station 220, as described below.

In some implementations, serving base station 220 may determine the service information, associated with target base station 220, based on information stored by target base station 220. For example, serving base station 220 may communicate with target base station 220 regarding handing user device 210 to target base station 220, and serving base station 220 may determine the service information, associated with target base station 220, during said communication. As another example, serving base station 220 may request the service information, associated with target base station 220, and may determine the service information based on a response, provided by target base station 220, that includes the service information associated with target base station 220.

As further shown in FIG. 8, process 800 may include providing handover information, including the service information associated with the target base station, to the user device (shown at reference number 820). For example, serving base station 220 may provide handover information, including the service information associated with target base station 220, to user device 210. In some implementations, serving base station 220 may provide the handover information to user device 210 after serving base station 220 determines the service information associated with target base station 220. Additionally, or alternatively, serving base station 220 may provide the service information, associated with target base station 220, after serving base station 220 communicates with target base station 220 regarding handing user device 210 over to target base station 220.

Handover information may include information associated with handing user device 210 over, from serving base station 220 to target base station 220, such that user device 210 may access a service, provided by service server 250, via target base station 220 and/or network 230. For example, serving base station 220 may send, to user device 210, RRC connection reconfiguration information associated with handing user device 210 over from serving base station 220 to target base station 220. In this example, serving base station 220 may include the service information, associated with target base station 220, within the RRC connection reconfiguration information provided to user device 210. Additionally, or alternatively, serving base station 220 may send another type of handover information associated with handing user device 210 over from serving base station 220 to target base station 220. In some implementations, user device 210 may receive the handover information, and may establish a connection between user device 210 and target base station 220 based on the handover information.

As further shown in FIG. 8, process 800 may include determining an access state, associated with the user device and the service, based on the service information associated with the target base station (shown at reference number 825). For example, user device 210 may determine an access state, associated with user device 210 and the service provided by service server 250, based on the service information associated with target base station 220. In some implementations, user device 210 may determine the access state after user device 210 receives the service information, associated with target base station 220, from serving base station 220. Additionally, or alternatively, user device 210 may determine the access state after user device 210 establishes the connection between user device 210 and target base station 220. In implementations, user device 210 may determine and/or interpret the access state based on the service information in the manner described above.

As further shown in FIG. 8, process 800 may include providing information associated with the access state (shown at reference number 830). For example, user device 210 may provide information associated with the access state. In some implementations, user device 210 may provide the information associated with access state after user device 210 determines the access state. Additionally, or alternatively, user device 210 may provide the information associated with the access state after user device 210 receives an indication to provide the information associated with the access state. In some implementations, user device 210 may provide the information associated with the access state in the manner described above.

In some implementations, if user device 210 is accessing the service when the handover occurs, user device 210 may provide the information associated with the access state when user device 210 stops accessing the service. For example, assume that the information associated with the access state for a VoIP service indicates that MT calls, associated with a VoIP service, are disabled, but also indicates that MT calls initiated before a handover (e.g., and still ongoing during the handover) may continue. In this example, user device 210 may wait until the ongoing MT VoIP call is terminated, and may then provide (e.g., to a VoIP server) information indicating that MT calls, associated with the VoIP service, are to be disabled (e.g., and the VoIP server may disable MT calls for user device 210 accordingly).

Although FIG. 8 shows example operations of process 800, in some implementations, process 800 may include additional operations, fewer operations, different operations, or differently arranged operations than those depicted in FIG. 8. Additionally, or alternatively, two or more of the operations of process 800 may be performed in parallel.

Figure 9A:
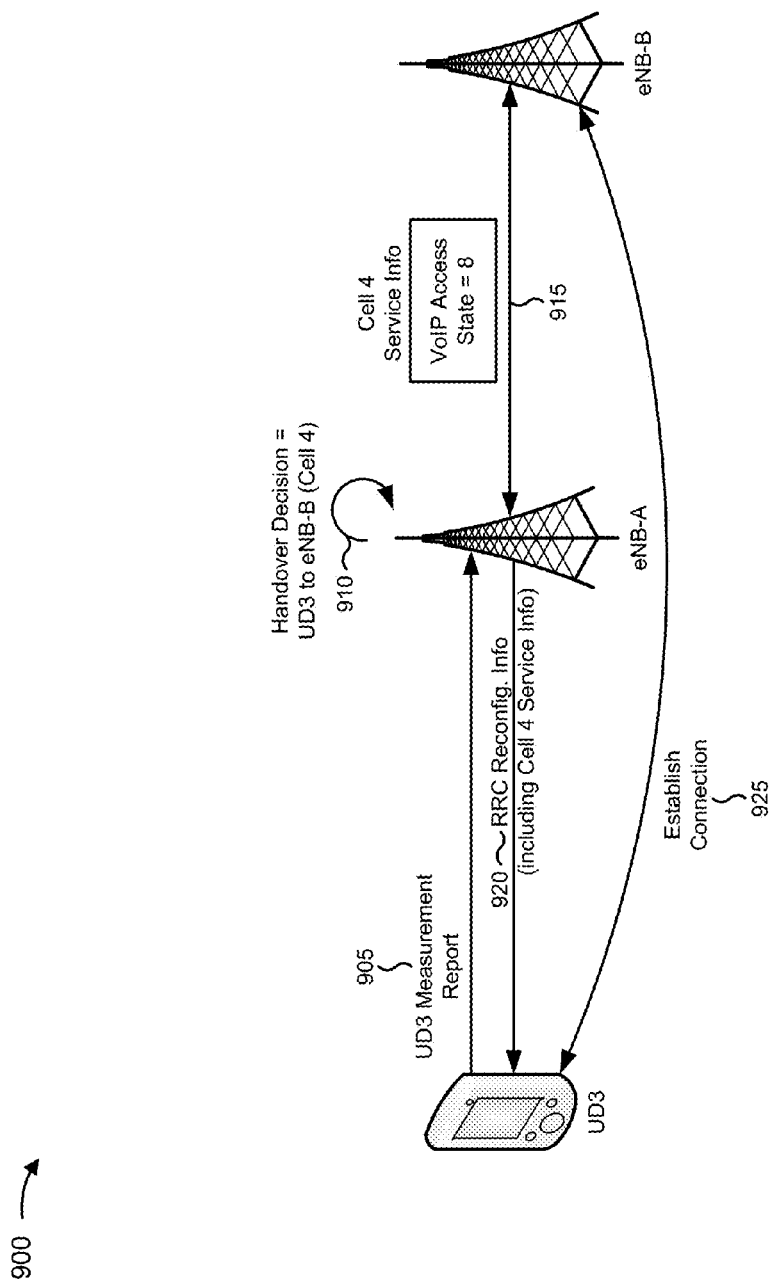
FIGS. 9A and 9B are diagrams of an example implementation relating to the example process shown in FIG. 8.
Figure 9B:
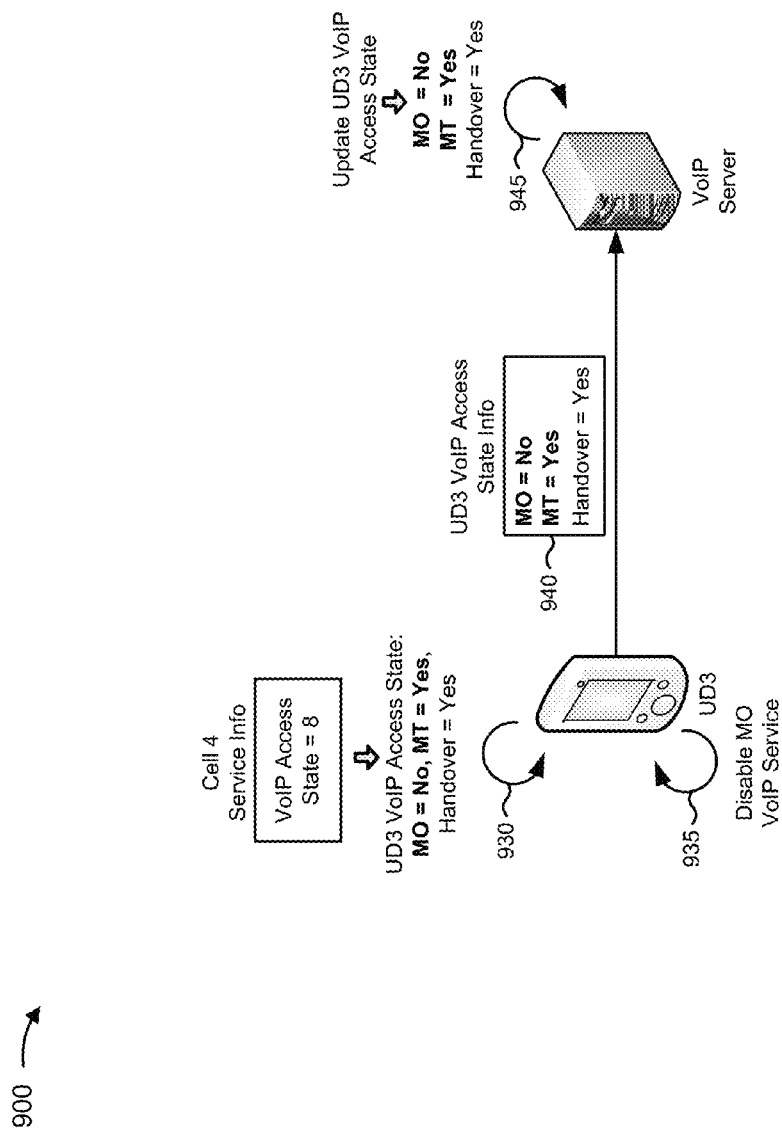

FIGS. 9A and 9B are diagrams of an example implementation 900 relating to example process 800 shown in FIG. 8. For the purposes of example implementation 900, assume that user device 210 (e.g., UD3) is located within a geographic area corresponding to a first cell (e.g., cell 1) served by a serving base station 220 (e.g., eNB-A), and that UD3 is connected to eNB-A. Further, assume that target base station 220 (e.g., eNB-B) serves a geographic area corresponding to a second cell (e.g., cell 4), and that eNB-B stores service information associated with a group of cells (e.g., including cell 4) served by eNB-B. Finally, assume that UD3 is moving from the geographic area corresponding to cell 1 to the geographic area corresponding to cell 4.

As shown in FIG. 9A, and by reference number 905, UD3 may provide a measurement report, associated with UD3 and identifying eNB-B, to eNB-A. As shown by reference number 910, eNB-A may receive the measurement report, and may determine (e.g., based on a handover algorithm stored by eNB-A) that UD3 is to be handed over to eNB-B (e.g., since UD3 is moving from cell 1 to cell 4). As shown by reference number 915, eNB-A may communicate with eNB-B regarding handing over UD3 from eNB-A to eNB-B, and, as shown, may determine service information for cell 4 that includes an access state for user devices 210, located in cell 4 and connected to eNB-B, accessing a VoIP service (e.g., VoIP Access State=8). As shown by reference number 920, eNB-A may provide (e.g., as part of a handover process associated with handing over UD3 to eNB-B) RRC connection reconfiguration information to UD3. As shown, the RRC connection reconfiguration information may include the cell 4 service information. As shown by reference number 925, UD3 may establish the connection between UD3 and eNB-B based on receiving the RRC connection reconfiguration information (e.g., including the cell 4 service information).

As shown in FIG. 9B, and by reference 930, UD3 may receive the cell 4 service information, may identify the access state for the VoIP service (e.g., VoIP Access State=8), and may interpret (e.g., based on information stored by UD3) the access state to determine information associated with the UD3 VoIP access state (e.g., UD3 VoIP Access State: MO=No, MT=Yes, Handover=Yes). As shown by reference number 935, UD3 may provide the information associated with UD3 VoIP access state to a VoIP client, hosted by UD3, that causes UD3 to disable a MO call feature of the VoIP service (e.g., such that UD3 may not place a VoIP call). As shown by reference number 940, UD3 may also provide the information associated with the UD3 VoIP access state to a VoIP server (e.g., associated with providing the VoIP service). As shown by reference number 945, the VoIP server may receive the information associated with the UD3 VoIP access state and may update information, stored by the VoIP server, such that the VoIP service may be accessed by UD3 in accordance with the information associated with the UD3 VoIP access state (e.g., the VoIP server update the information such that UD3 may receive MT VoIP calls via the VoIP service).

As indicated above, FIGS. 9A and 9B are provided merely as an example. Other examples are possible and may differ from what was described with regard to FIGS. 9A and 9B.

Figure 10:
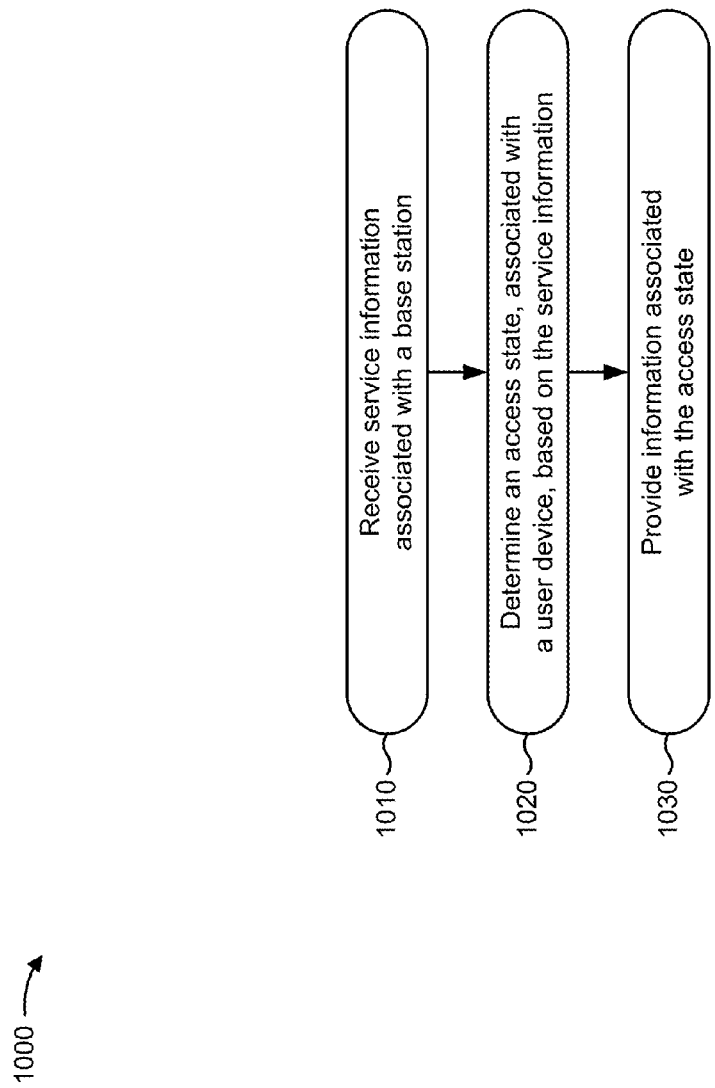
FIG. 10 is a flow chart of an example process for determining an access state, associated with a user device, based on service information associated with a base station.

FIG. 10 is a flow chart of an example process 1000 for determining an access state, associated with a user device, based on service information associated with a base station. In some implementations, one or more process blocks of FIG. 10 may be performed by user device 210. Additionally, or alternatively, one or more process blocks of FIG. 10 may be performed by another device or a group of devices separate from or including user device 210, such as base station 220 and/or service server 250.

As shown in FIG. 10, process 1000 may include receiving service information associated with a base station (block 1010). For example, user device 210 may receive service information associated with base station 220, as described above.

As further shown in FIG. 10, process 1000 may include determining an access state, associated with the user device, based on the service information (block 1020). For example, user device 210 may determine an access state, associated with user device 210 and based on the service information, as described above.

As further shown in FIG. 10, process 1000 may include providing information associated with the access state (block 1030). For example, user device 210 may provide information associated with the access state, as described above.

Although FIG. 10 shows example blocks of process 1000, in some implementations, process 1000 may include additional blocks, fewer blocks, different blocks, or differently arranged blocks than those depicted in FIG. 10. Additionally, or alternatively, two or more of the blocks of process 1000 may be performed in parallel.

Implementations described herein may permit a service provider to control access to a service and/or a manner in which the service may be accessed within a geographic area served by a base station and/or within a portion of the geographic area served by the base station (e.g., a cell, a sector, etc.).

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

To the extent the aforementioned embodiments collect, store or employ personal information provided by individuals, it should be understood that such information shall be used in accordance with all applicable laws concerning protection of personal information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A base station, comprising:
   one or more memories; and
   one or more processors, communicatively coupled to the one or more memories, to:
      determine one or more performance metrics associated with the base station;
      determine, based on the one or more performance metrics, service information associated with the base station,
         the service information corresponding to a portion of a geographic area serviced by the base station that is less than an entire geographic area serviced by the base station, and
         the service information including information that identifies a first access state associated with a service,
            the first access state indicating whether a user device, located in the portion of the geographic area serviced by the base station, is permitted to access the service or access a feature of the service,
            the first access state being different from a second access state associated with the service,
            the second access state corresponding to a different portion of the geographic area, serviced by the base station, that is less than the entire geographic area serviced by the base station; and
      provide the service information to the user device to cause the user device to access the service or the feature of the service based on the first access state.

2. The base station of claim 1, where the one or more performance metrics include at least one of:
   a quality of service level associated with the base station;
   a cell capacity consumption associated with the base station; or
   a service blocking statistic associated with the base station.

3. The base station of claim 1, where the service information is updated service information associated with updating, altering, or modifying existing service information associated with the base station,
   the existing service information corresponding to the portion of the geographic area serviced by the base station, and the existing service information being associated with the second access state associated with the service.

4. The base station of claim 1, where the one or more processors, when providing the service information, are to:
broadcast a message to a plurality of user devices connected to the base station,
the plurality of user devices including the user device, and
the message including the service information.

5. The base station of claim 4, where the one or more processors are further to:
raise a broadcast flag based on receiving the service information,
the broadcast flag being raised to notify the plurality of user devices to read the message; and
where the one or more processors, when broadcasting the message, are to:
broadcast the message based on raising the broadcast flag.

6. The base station of claim 1, where the one or more processors, are further to:
establish a connection with another user device;
determine that the other user device is located in the portion of the geographic area serviced by the base station; and
provide the service information to the other user device based on determining that the other user device is located in the portion of the geographic area.

7. The base station of claim 1, where the portion of the geographic area serviced by the base station is a particular cell serviced by the base station or a particular sector serviced by the base station.

8. A non-transitory computer-readable medium storing instructions, the instructions comprising:
one or more instructions that, when executed by one or more processors, cause the one or more processors to:
obtain a set of performance metrics associated with a base station;
determine, based on the set of performance metrics, service information associated with the base station,
the service information corresponding to a portion of a geographic area, serviced by the base station, that is less than an entire geographic area serviced by the base station, and
the service information including information that identifies a first access state associated with a service,
the first access state indicating whether a user device, while located in the portion of the geographic area serviced by the base station, is permitted to access the service or access a feature of the service,
the first access state being different from a second access state associated with the service,
the second access state corresponding to a different portion of the geographic area, serviced by the base station, that is less than the entire geographic area serviced by the base station; and
provide the service information to the user device to cause the user device to access the service or the feature of the service based on the first access state.

9. The non-transitory computer-readable medium of claim 8, where the set of performance metrics includes information associated with at least one of:
a quality of service level provided by the base station;
a cell capacity consumption of the base station; or
a service blocking statistic associated with the base station.

10. The non-transitory computer-readable medium of claim 8, where the service information is updated service information associated with updating, altering, or modifying existing service information associated with the base station,
the existing service information corresponding to the portion of the geographic area serviced by the base station, and
the existing service information being associated with the second access state associated with the service.

11. The non-transitory computer-readable medium of claim 8, where the one or more instructions, that cause the one or more processors to provide the service information, cause the one or more processors to:
broadcast a message to a plurality of user devices, connected to the base station, that are located in the portion of the geographic area serviced by the base station,
the plurality of user devices including the user device, and
the message including the service information.

12. The non-transitory computer-readable medium of claim 11, where the one or more instructions, when executed by the one or more processors, further cause the one or more processors to:
raise a broadcast flag based on determining the service information,
the broadcast flag being raised to notify the plurality of user devices to read the message; and
where the one or more instructions, that cause the one or more processors to broadcast the message, cause the one or more processors to:
broadcast the message based on raising the broadcast flag.

13. The non-transitory computer-readable medium of claim 8, where the one or more instructions, when executed by the one or more processors, further cause the one or more processors to:
establish a connection with another user device;
determine that the other user device is located in the portion of the geographic area serviced by the base station; and
provide the service information to the other user device based on determining that the other user device is located in the portion of the geographic area.

14. The non-transitory computer-readable medium of claim 8, where the portion of the geographic area serviced by the base station is a particular cell serviced by the base station or a particular sector serviced by the base station.

15. A method, comprising:
determining, by a base station, one or more performance metrics associated with the base station;
determining, based on the one or more performance metrics, service information associated with the base station,
the service information corresponding to a portion of a geographic area, serviced by the base station, that is less than an entire geographic area serviced by the base station, and
the service information including information that identifies a first access state associated with a service,
the first access state indicating whether a user device, located in the portion of the geographic area serviced by the base station, is permitted to access the service or access a feature of the service, the first access state being different from a second access state associated with the service,
    the second access state corresponding to a different portion of the geographic area, serviced by the base station, that is less than the entire geographic area serviced by the base station; and
providing, by the base station, the service information to the user device to cause the user device to access the service or the feature of the service based on the first access state.

16. The method of claim 15, where the one or more performance metrics include at least one of:
a quality of service level associated with the base station;
a cell capacity consumption associated with the base station; or
a service blocking statistic associated with the base station.

17. The method of claim 15, where providing the service information comprises:
broadcasting a message to a plurality of user devices connected to the base station,
    the plurality of user devices including the user device, and
    the message including the service information.

18. The method of claim 17, further comprising:
raising a broadcast flag based on receiving the service information,
    the broadcast flag being raised to notify the plurality of user devices to read the message.

19. The method of claim 15, further comprising:
establishing a connection with another user device;
determining that the other user device is located in the portion of the geographic area serviced by the base station; and
providing the service information to the other user device based on determining that the other user device is located in the portion of the geographic area.

20. The method of claim 15, where the portion of the geographic area serviced by the base station is a particular cell serviced by the base station or a particular sector serviced by the base station.

* * * * *